(12) United States Patent
Matsuo et al.

(10) Patent No.: US 8,559,462 B2
(45) Date of Patent: Oct. 15, 2013

(54) SYNCHRONIZATION SIGNAL DETECTION APPARATUS

(75) Inventors: Kazushi Matsuo, Chiryu (JP); Toshihiko Matsuoka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 208 days.

(21) Appl. No.: 13/029,430

(22) Filed: Feb. 17, 2011

(65) Prior Publication Data
US 2011/0206067 A1   Aug. 25, 2011

(30) Foreign Application Priority Data
Feb. 22, 2010   (JP) ................. 2010-035959

(51) Int. Cl.
*H04L 7/00* (2006.01)
*H04J 3/24* (2006.01)

(52) U.S. Cl.
USPC ..................................... 370/475

(58) Field of Classification Search
USPC ............ 370/464, 475, 498, 503, 509, 514; 375/286, 293, 354, 355, 362
See application file for complete search history.

(56) References Cited

U.S. PATENT DOCUMENTS

| | | | | |
|---|---|---|---|---|
| 5,442,636 | A * | 8/1995 | Bontekoe | 370/509 |
| 6,567,489 | B1 * | 5/2003 | Glover | 375/376 |
| 6,959,014 | B2 * | 10/2005 | Pohlmeyer et al. | 370/514 |
| 7,218,628 | B2 * | 5/2007 | Chiu et al. | 370/349 |
| 7,359,367 | B2 * | 4/2008 | Miyamoto | 370/350 |
| 7,620,075 | B2 * | 11/2009 | Ishimoto | 370/503 |
| 2003/0103584 | A1 | 6/2003 | Bjerke et al. | |
| 2005/0091428 | A1 * | 4/2005 | Matsumoto et al. | 710/52 |
| 2006/0013348 | A1 * | 1/2006 | Klosters et al. | 375/368 |
| 2006/0245515 | A1 * | 11/2006 | Tachi | 375/293 |
| 2007/0014339 | A1 * | 1/2007 | Yanagida et al. | 375/220 |
| 2008/0276023 | A1 | 11/2008 | Wenzel | |
| 2009/0323877 | A1 * | 12/2009 | Tachi | 375/362 |
| 2010/0052743 | A1 * | 3/2010 | Kamizuma et al. | 327/144 |

FOREIGN PATENT DOCUMENTS

| | | |
|---|---|---|
| CN | 1447555 A | 10/2003 |
| JP | 2005-277994 A | 10/2005 |

OTHER PUBLICATIONS

CN Office Action dated May 28, 2013 in the corresponding CN application No. 201110085765.6; English translation.

* cited by examiner

*Primary Examiner* — Chi Pham
*Assistant Examiner* — Robert Lopata
(74) *Attorney, Agent, or Firm* — Posz Law Group, PLC (57) ABSTRACT

A synchronization signal detection apparatus includes a temporary synchronization signal detector and a final synchronization signal detector. A header of a synchronization signal has at least M successive bits of a first level, where M is an integer more than the Nth power of 2, and N is a positive integer. The synchronization signal has alternating bits starting with a second level. The temporary synchronization signal detector detects the Nth power of 2 successive bits of the first level as a temporary synchronization signal when receiving the Nth power of 2 successive bits of the first level before receiving the alternating bits. The final synchronization signal detector determines that the detected temporary synchronization signal is the header when receiving the at least M successive bits of the first level.

8 Claims, 8 Drawing Sheets

FIG. 6A BUS SIGNAL

FIG. 6B TIMER-A

FIG. 6C COM-A

FIG. 6D MEM-A

FIG. 6E TEMP SYNC DETECTOR

FIG. 6F MEM-B

FIG. 6G TIMER-B

FIG. 6H FINAL SYNC DETECTOR

FIG. 7A 
BUS SIGNAL

FIG. 7B 
TIMER-A

FIG. 7C 
COM-A

FIG. 7D 
MEM-A

FIG. 7E 
TEMP SYNC DETECTOR

FIG. 7F 
MEM-B

FIG. 7G 
TIMER-B

FIG. 7H 
FINAL SYNC DETECTOR

SYNCHRONIZATION SIGNAL DETECTION APPARATUS

CROSS REFERENCE TO RELATED APPLICATION

This application is based on and claims priority to Japanese Patent Application No. 2010-35959 filed on Feb. 22, 2010, the contents of which are incorporated herein by reference.

FIELD OF THE INVENTION

The present invention relates to a synchronization signal detection apparatus for detecting a synchronization signal.

BACKGROUND OF THE INVENTION

Systems for performing communication between a master and a slave through a bus have been proposed. For such systems, there are lots of communication protocols using a synchronization signal. The slave monitors a waveform of the bus and determines whether a signal transmitted through the bus is a synchronization signal.

For example, one of communication protocols for in-vehicle local area network (LAN) is local interconnected network (LIN). According to the LIN specification, the header of the frame transmitted by the master contains a Synch Break Field, a high level bit following the Synch Break Field, and a Synch Field following the high level bit. The Synch Break Field has at least 11 bits of low level. The Synch Field has the data "0x55". As described in, for example, US 2009/0323877 corresponding to JP 2009-303178, the Synch Field is followed by an Identifier Field and a Data Field. In the slave, a baud rate is calculated by calculating one-bit period using a reference clock.

In US 2009/0323877, the measurement value of bit made by the timer is sequentially transmitted to the first through fourth memories. The measurement values stored in these memories are compared by the first through third comparators. The Synch Break and the Synch Field are detected based on the comparison results.

Specifically, according to the first embodiment disclosed in US 2009/0323877, the first comparator compares the measurement value stored in the second memory with the measurement value stored in the third memory. Then, when the ratio between the measurement values is 11 or more, it is determined that the first condition is met. Further, the second comparator compares the measurement value stored in the first memory with the measurement value stored in the second memory. Then, when the difference between the measurement values is within the margin of error, it is determined that the second condition is met. When both the first condition and the second condition are met, it is determined that the Synch Break and the Synch Field are detected. The baud rate calculator calculates the baud rate by calculating the reciprocal of the value that is obtained by multiplying the resolution by the measurement value W20 stored in the second memory.

Further, according to the second embodiment disclosed in US 2009/0323877, the first comparator compares the measurement value stored in the third memory with the measurement value stored in the fourth memory. Then, when the ratio between the measurement values is 11 or more, it is determined that the first condition is met. Further, the second comparator compares the measurement value stored in the second memory with the measurement value stored in the third memory. Then, when the difference between the measurement values is within the margin of error, it is determined that the second condition is met. Furthermore, the third comparator compares the measurement value stored in the first memory with the measurement value stored in the third memory. Then, when the difference between the measurement values is within the margin of error, it is determined that the third condition is met. When all the first, second, and third conditions are met, it is determined that the Synch Break and the Synch Field are detected. The average calculator stores the average of the measurements of the widths of three low level pulses. The baud rate calculator calculates the baud rate by calculating the reciprocal of the value that is obtained by multiplying the resolution by the average pulse width, thereby reducing measurement errors.

However, the technique disclosed in US 2009/0323877 requires a large memory and a lot of computations. Therefore, to achieve the technique by hardware, a circuit has a large size.

Such a technique is disclosed in US/20060245515 corresponding to JP 4327764, US 2008/0276023 corresponding to JP 2008-518497, US 2003/0103584 corresponding to JP 2006-503446, and JP 2005-277994. For example, in US/20060245515, the period of the second level before the period of the first level is defined as the first period, and the period of the second level after the period of the first level is defined as the second period. When the ratio between the first and second periods is equal to or greater than the predetermined value, the signal following the second period is determined as the synchronization signal, and the reciprocal of the second period is determined as the baud rate.

However, according to the technique disclosed in US/20060245515, the signal following the second period is determined as the synchronization signal, even if the synchronization signal does not satisfy the communication protocol specification (i.e., 0x55h). Therefore, incorrect data transmission may occur. Further, since the reciprocal of the second period is determined as the baud rate, the baud rate may have error.

SUMMARY OF THE INVENTION

In view of the above, it is an object of the present invention to provide a synchronization signal detection apparatus for accurately detecting a synchronization signal by reducing computations as much as possible.

According to an aspect of the present invention, a synchronization signal detection apparatus for a bus signal includes a temporary synchronization signal detector and a final synchronization signal detector. The bus signal varies between a first level and a second level. The bus signal includes a header field and a synchronization signal field following the header field. The header field has at least M successive bits of the first level, where M is an integer more than the Nth power of 2, and N is a positive integer. The synchronization signal field has alternating bits starting with the second level. An individual bit of each of the header field and the synchronization signal field has the same bit length. The temporary synchronization signal detector detects the Nth power of 2 successive bits of the first level as a temporary synchronization signal when receiving the Nth power of 2 successive bits of the first level before receiving the alternating bits. The final synchronization signal detector determines that the detected temporary synchronization signal is the header field when receiving the at least M successive bits of the first level.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENT

An embodiment of the present invention is described below with reference to FIGS. 1-7H. A Local Interconnect Network (LIN) protocol can be used for in-vehicle communication processing. The LIN protocol is a type of in-vehicle LAN communication protocol and complements multiple networks for in-vehicle applications to achieve quality improvement and cost reduction of an in-vehicle network.

Figure 3:
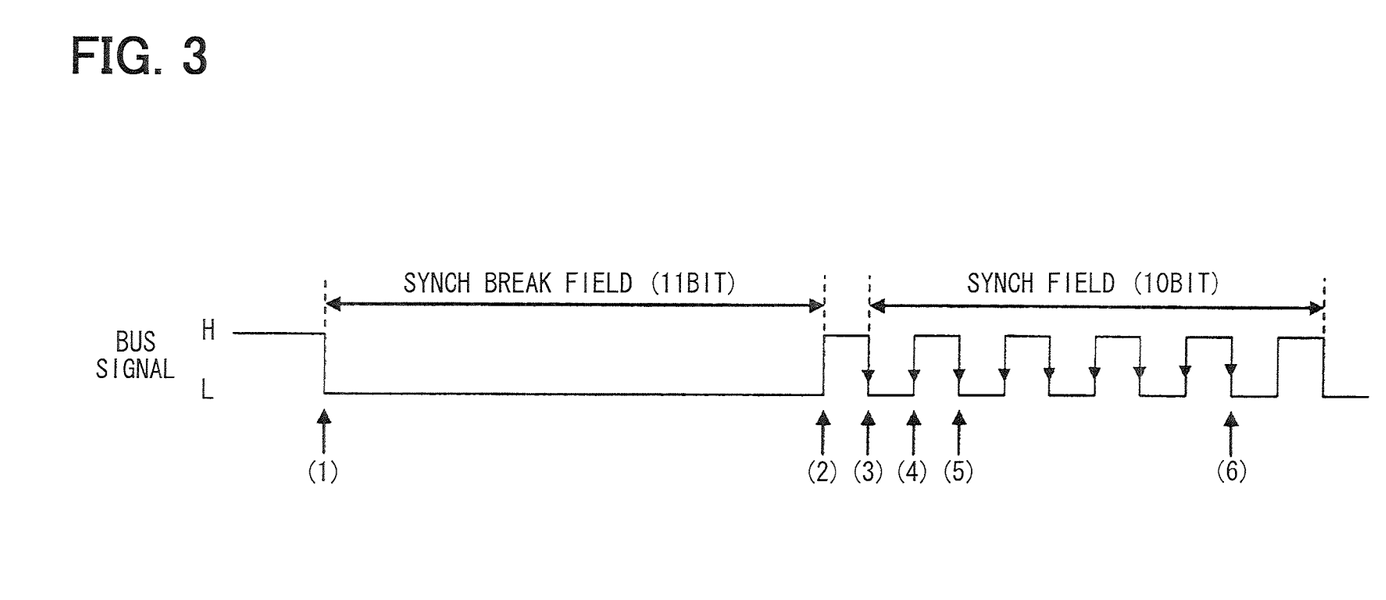
FIG. 3 is a diagram illustrating a synchronization signal according to Local Interconnect Network (LIN) Specification.

FIG. 3 illustrates part of a LIN frame specified in the LIN. As shown in FIG. 3, the LIN frame has a Synch Break Field indicating the start of the frame, a high-level bit following the Synch Break Field, and a Synch Field following the recessive bit. According to the LIN specification, the Synch Break Field is a bit string of at least 11 (i.e., an integer M) successive bits of 0 (i.e., low level). The Synch Field is a bit string representing a value "0x55" and having a length of 10 bits, for example. That is, the Synch Field is an alternating bit string of 0 (i.e., low level) and 1 (i.e., high level).

Figure 1:
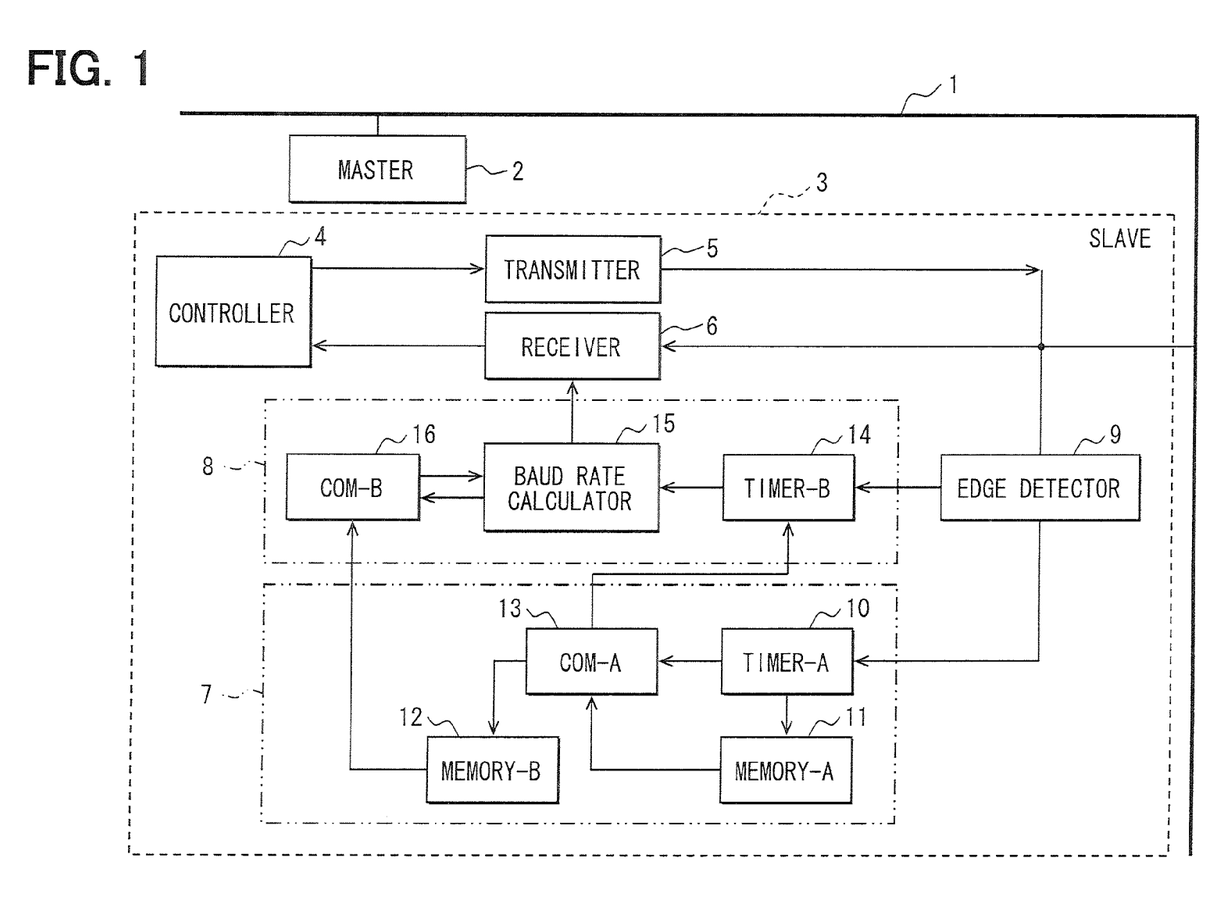
FIG. 1 is a block diagram illustrating a synchronization signal detection apparatus according to an embodiment of the present invention.
Figure 2:
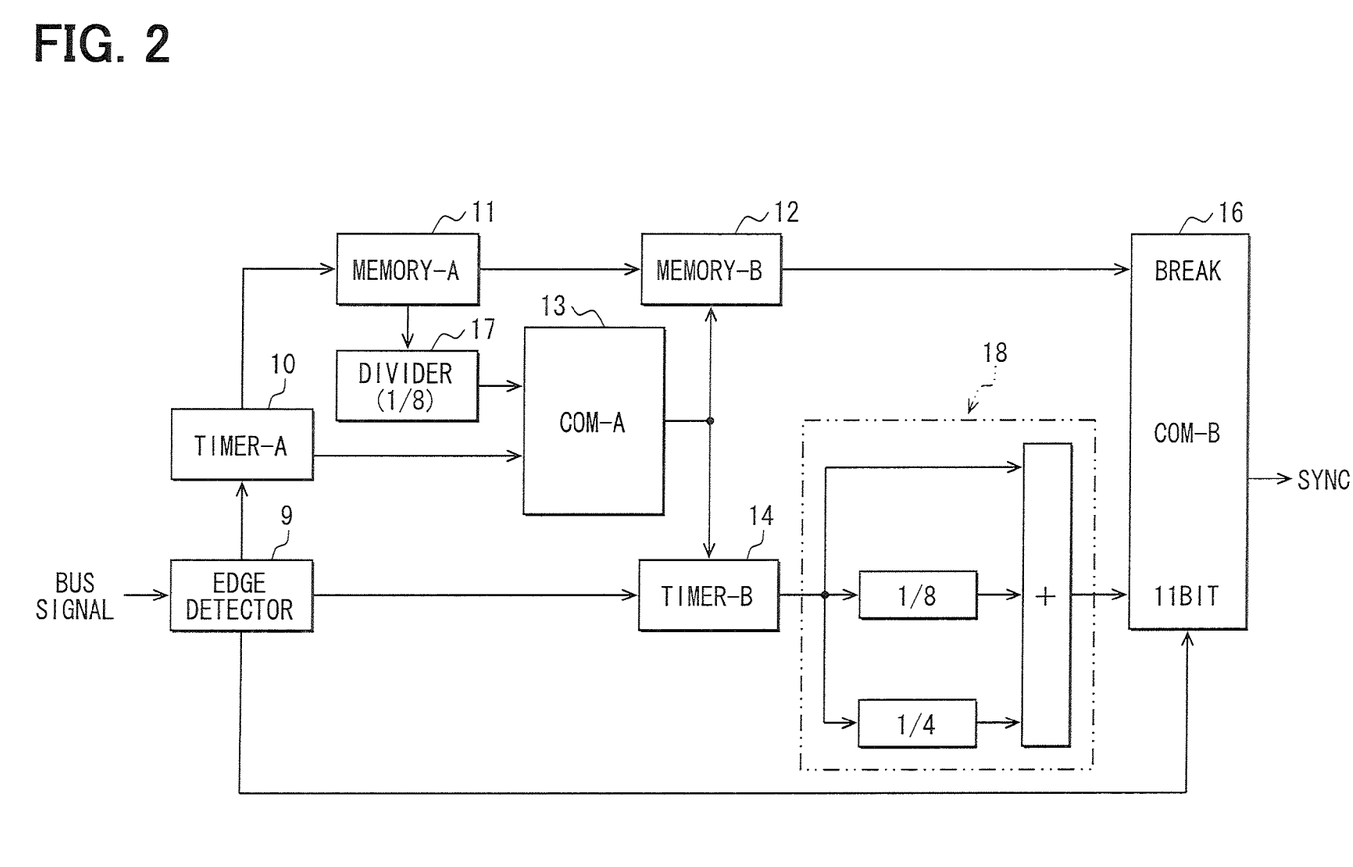
FIG. 2 is a block diagram illustrating a hardware configuration of the synchronization signal detection apparatus.

FIG. 1 is a block diagram of a slave node 3 as a synchronization signal detection apparatus according to the embodiment. FIG. 2 is a block diagram of an example of a hardware configuration of the slave node 3. As shown in FIG. 1, a master node 2 and the slave node 3 are connected to a bus 1. A bus signal is transmitted and received between the master node 2 and the slave node 3 through the bus 1. For example, the slave node 3 can be a one-chip microcomputer incorporated in an electronic control unit (ECU), a sensor, an actuator, or the like. The slave node 3 includes a controller 4, a transmitter 5, a receiver 6, a temporary synchronization signal detector 7, a final synchronization signal detector 8, and an edge detector 9.

The slave node 3 calculates a baud rate (i.e., communication rate) based on the Synch Field transmitted from the master node 2 to the slave node 3 through the bus 1, and then slave node 3 receives data at the calculated baud rate. When the slave node 3 receives the Synch Break Field and the Synch Field, the slave node 3 interprets signals following the Synch Field as an Identifier Field and a Data Field.

The transmitter 5 of the slave node 3 transmits data to the master node 2 based on a control signal received from the controller 4. The master node 2 receives the data transmitted from the transmitter 5. The receiver 6 of the slave node 3 receives data transmitted from the master node 2 and sends the received data to the controller 4. The edge detector 9 of the slave node 3 detects a falling edge and/or a rising edge of the data that is received from the master node 2 through the bus 1.

The temporary synchronization signal detector 7 includes a timer-A 10, a memory-A 11, a memory-B 12, and a comparator-A 13. The temporary synchronization signal detector 7 measures an edge detection time interval between a falling edge and a rising edge of the bus signal, which is a pulse signal. The edge detection time interval is a period of time where the bus signal is kept at the low level or the high level. For example, the comparator-A 13 compares two edge detection time intervals that are continuously measured. Then, if the previously measured edge detection time interval is a predetermined value (e.g., 8=the third (Nth) power of 2) or more times greater than the presently measured edge detection time interval, the comparator-A 13 forward data stored in the memory-A 11 to the memory-B 12.

The "falling edge" is a time when the bus signal varies from the high level (i.e., second level) to the low level (i.e., first level). The "rising edge" is a time when the bus signal varies from the low level to the high level. The predetermined value can be other than 8, as long as the predetermined value is the Nth power of 2, where N is a positive integer. In such an approach, the comparison can be achieved by a binary shift operation using a shift register.

The final synchronization signal detector 8 includes a timer-B 14, a baud rate calculator 15, and a comparator-B 16. In the final synchronization signal detector 8, the timer-B 14 is activated, when the comparator-A 13 forwards the data stored in the memory-A 11 to the memory-B 12.

The timer-B 14 uses a value measured by the timer-A 10 as an initial value. That is, the timer-B 14 starts measuring from the value measured by the timer-A 10. Then, when the edge detector 9 detects the falling edge Z times (e.g., four times), where Z is a positive integer, the timer-B 14 stops measuring. The edge detector 9 and the timer-B 14 determine, based on the fact that the falling edge is detected Z times, that an alternating binary signal of Z×2 bits (e.g., 4×2=8 bits) is received.

The baud rate calculator 15 calculates an average duration corresponding to one-bit length of the alternating binary signal by dividing the duration measured by the timer-B 14 by Z×2 (e.g., 8). The duration measured by the timer-B 14 represents the length of the alternating binary signal of Z×2 bits. Then, the baud rate calculator 15 determines whether a quotient of the data stored in the memory-B 12 divided by the average duration is equal to or greater than 11 (i.e., eleven). Then, if the quotient is equal to or greater than 11, the baud rate calculator 15 determines that the data stored in the memory-B 12 is the Synch Break field, which is a header of the Synch field as a synchronization signal. Then, the baud rate calculator 15 calculates the baud rate based on the average duration corresponding to one-bit length.

Figure 4A:
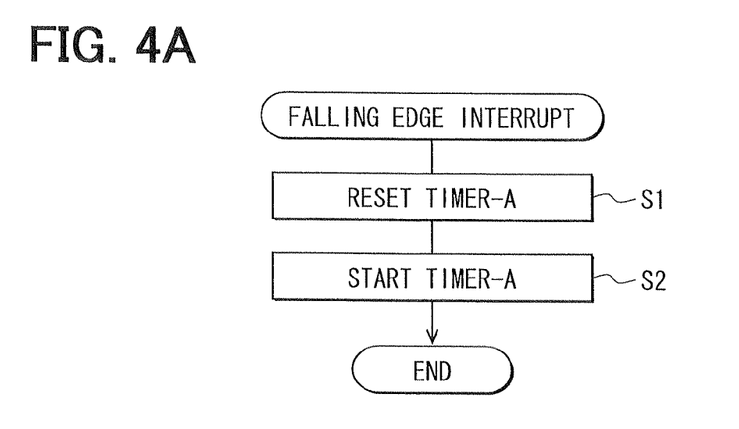
FIG. 4A is a flow chart of a falling edge interrupt routine performed when a falling edge of a bus signal is detected.

Details are described below with reference to FIGS. 4A-7H. FIG. 4A is a flow diagram of a falling edge interrupt routine performed when the edge detector 9 detects the falling edge (refer to the time (1) in FIGS. 3, 6A, and 7A). As shown in FIG. 4A, the falling edge interrupt routine the controller 4 starts at S1, where controller 4 resets the timer-A 10 to 0 (i.e., zero). Then, the falling edge interrupt routine proceeds to S2, where the controller 4 starts the timer-A 10.

Figure 4B:
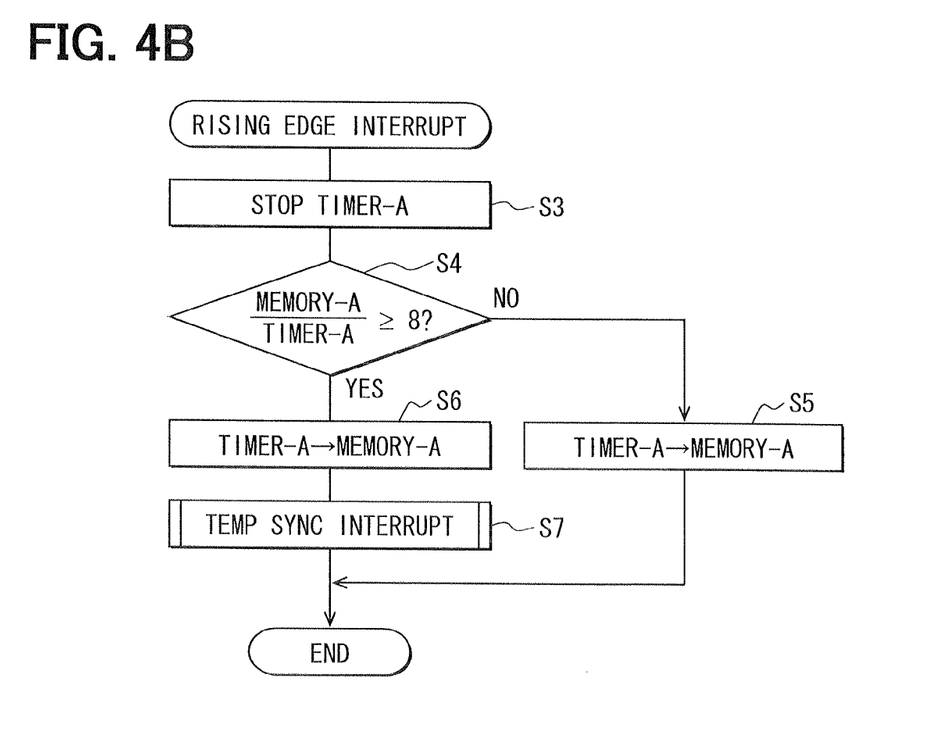
FIG. 4B is a flow chart of a rising edge interrupt routine performed when a rising edge of the bus signal is detected.
Figure 6A:
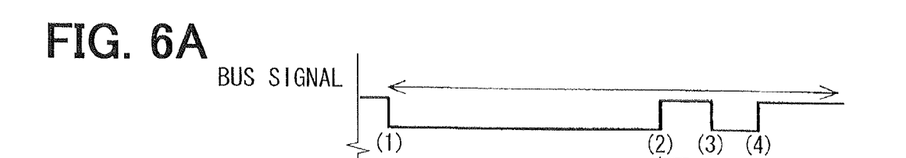
FIGS. 6A-6H are timing diagrams of the synchronization signal detection apparatus when the temporary synchronization signal is not detected.
Figure 6B:
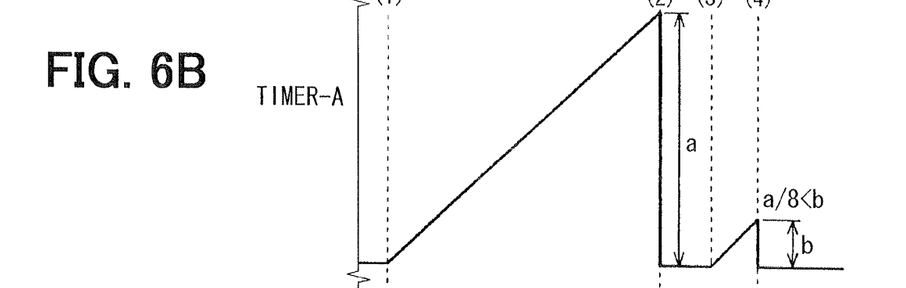
Figure 6C:
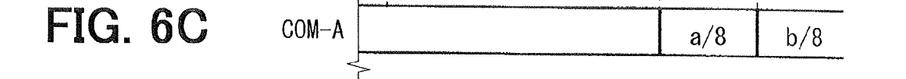
Figure 6D:
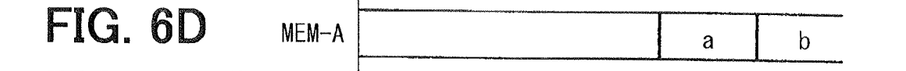
Figure 6E:
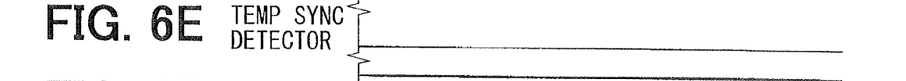
Figure 6F:
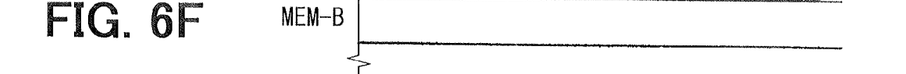
Figure 6G:
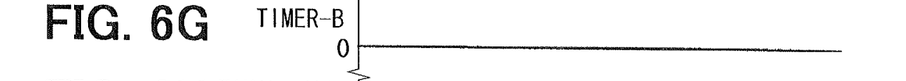
Figure 6H:
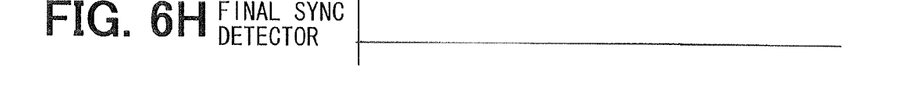
Figure 7A:
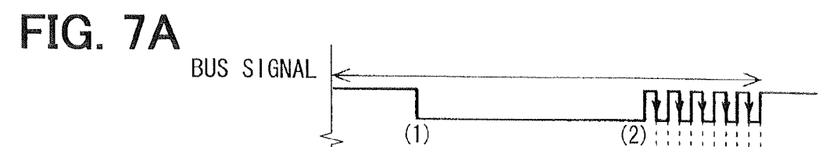
FIGS. 7A-7H are timing diagrams of the synchronization signal detection apparatus when the temporary synchronization signal is detected.
Figure 7B:
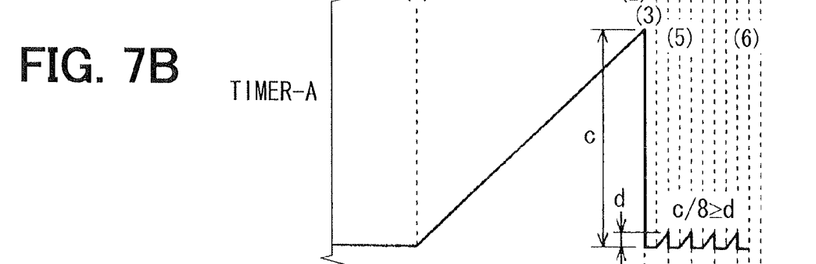
Figure 7C:
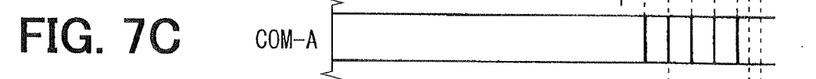
Figure 7D:
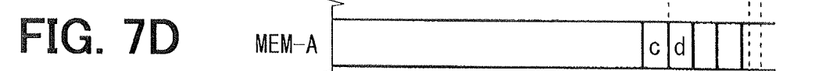
Figure 7E:
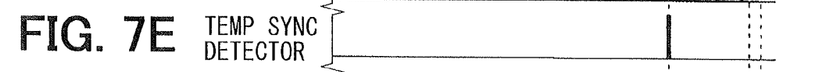
Figure 7F:
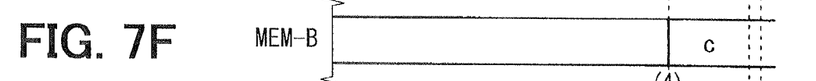
Figure 7G:
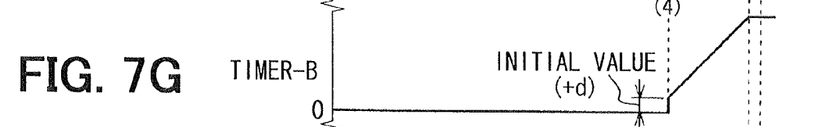

FIG. 4B is a flow diagram of a rising edge interrupt routine performed when the edge detector 9 detects the rising edge (refer to the time (2) in FIGS. 3, 6A, and 7A). As shown in FIG. 4B, the rising edge interrupt routine starts at S3, where the controller 4 stops the timer-A 10.

Then, the rising edge interrupt routine proceeds to S4, where the comparator-A 13 determines whether the quotient of the data (i.e., the previously measured edge detection time interval) stored in the memory-A 11 divided by the duration (i.e., the presently measured edge detection time interval) measured by the timer-A 10 is equal to or greater than the predetermined value (e.g., 8). If the quotient is less than the predetermined value corresponding to NO at S4, the rising edge interrupt routine proceeds to S5, where the duration (i.e., the presently measured edge detection time interval) measured by the timer-A 10 is stored in the memory-A 11. Then, the rising edge interrupt routine is finished. Thus, at S4, it is determined whether the previously measured edge detection time interval is the predetermined value or more times greater than the presently measured edge detection time interval.

Specifically, in FIG. 3, an interval between the time (1) and the time (2) is the previously measured edge detection time interval, and an interval between the time (3) and the time (4) is the presently measured edge detection time interval.

FIGS. 6A-6H show a case where the quotient of the previously measured edge detection time interval "a", which is previously measured by the timer-A 10 and stored in the memory-A 11, divided by the presently measured edge detection time interval "b", which is presently measured by the timer-A 10 is less than the predetermined value (e.g., 8). That is, FIGS. 6A-6H show the case where "a/8<b". In the case of FIGS. 6A-6H, it is determined that a temporary synchronization signal is not detected. That is, it is determined as "NO" at step S4 in FIG. 4B, so that the rising edge interrupt routine is finished after S5.

Figure 5:
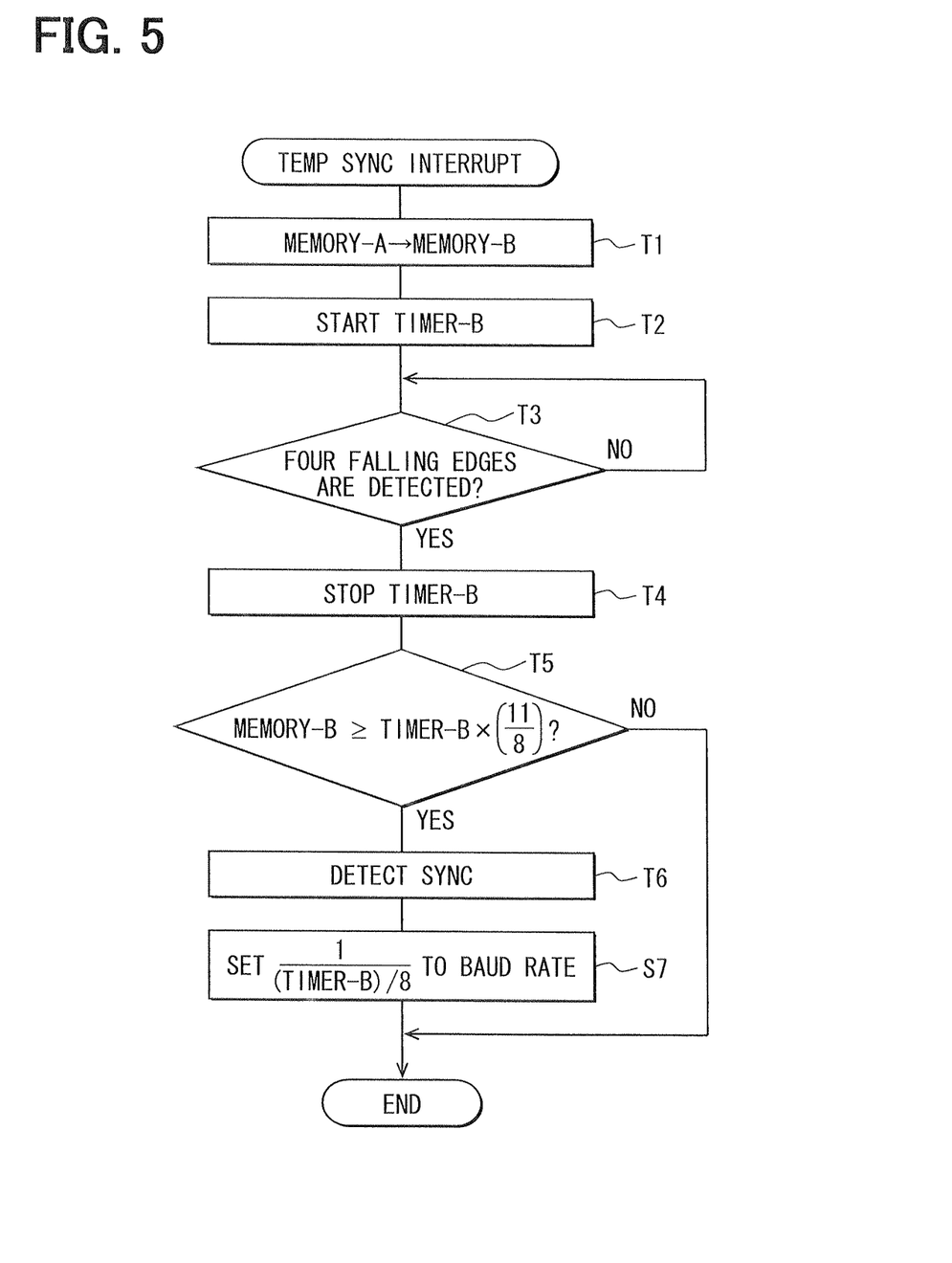
FIG. 5 is a flow chart of a temporary synchronization signal detection interrupt routine performed when the temporary synchronization signal is detected.

In contrast, FIGS. 7A-7H show a case where the quotient of the previously measured edge detection time interval "c", which is previously measured by the timer-A 10 and stored in the memory-A 11, divided by the presently measured edge detection time interval "d", which is presently measured by the timer-A 10 is equal to or greater than the predetermined value. That is, FIGS. 7A-7H show the case where "c/8≥d". In the case of FIGS. 7A-7H, it is determined that the temporary synchronization signal is detected. That is, it is determined as "YES" at step S4 in FIG. 4B, so that the rising edge interrupt routine proceeds to S6. At S6, the value of the timer-A 10 is stored in the memory-A 11. Then, the rising edge interrupt routine proceeds to S7, where a temporary synchronization signal detection interrupt routine shown in FIG. 5 is called.

A reason for using the temporary synchronization signal detection process is that the number (i.e., 11) of bits of the Synch Break Field is difficult for a computer (hardware, software) to handle. If the temporary synchronization signal detection process is not used, there is a need to perform complex calculation processing on all data of the bus signal to detect a synchronization signal.

The temporary synchronization signal detection process is used to reduce a frequency with which the complex calculation processing is performed. In the temporary synchronization signal detection process, it is determined whether the number of the low level successive bits is at least 8, which is the maximum number that is a power of 2 less than 11. When this condition is satisfied, it is determined that the temporary synchronization signal is detected. Then, the complex calculation processing for detecting a synchronization signal is performed only on the detected temporary synchronization signal.

The temporary synchronization signal detection process is achieved only by repeating a binary shift operation three times. Therefore, the temporary synchronization signal detection process can be finished within a short time. Further, a hardware configuration of a circuit for the temporary synchronization signal detection process can be simplified. Since the complex calculation processing for detecting a synchronization signal is performed only on the detected temporary synchronization signal, the frequency with which the complex calculation processing is performed can be reduced.

As mentioned previously, according to the embodiment, a ratio between the two edge detection time intervals is 8 or more, the temporary synchronization signal is detected. Then the temporary synchronization signal detection interrupt routine shown in FIG. 5 is performed to determine whether the detected temporary synchronization signal detection is the synchronization signal or not.

The temporary synchronization signal detection interrupt routine is described below with reference to FIG. 5. As shown in FIG. 5, the temporary synchronization signal detection interrupt routine starts at T1, where the data stored in the memory-A 11 is sent to the memory-B 12. Then, the temporary synchronization signal detection interrupt routine proceeds to T2, where the timer-B 14 is activated by setting an initial value of the timer-B 14 to the value of the timer-A 10. A reason for setting the initial value of the timer-B 14 to the value of the timer-A 10 is that there is a time lag between the timer-B 14 activation point and the last falling edge detection point (refer to the time (3) in FIGS. 3 and 7A). Therefore, as of the timer-B 14 activation point, the time interval "d" between the last falling edge detection point and the last rising edge detection point (refer to the time (4) in FIGS. 3 and 7G) is measured by the timer-A 10. By setting the initial value of the timer-B 14 to the value "d" of the timer-A 10, the timer-B 14 can start measuring from the last falling edge detection point indicated by the time (3) in FIGS. 3 and 7A.

Then, the temporary synchronization signal detection interrupt routine proceeds to T3, where it is determined whether the falling edge is detected Z times (e.g., 4 times), where Z is a positive integer. If the falling edge is detected Z times corresponding to YES at T3, the temporary synchronization signal detection interrupt routine proceeds to T4, where the timer-B 14 stops measuring.

Assuming that the integer Z is 4, the timer-B 14 measures not only four intervals, each of which is between when the bus signal varies from the high level to the low level (e.g., the time (3) in FIGS. 7A-7H) and when the bus signal varies from the low level to the high level (e.g., the time (4) in FIGS. 7A-7H) but also four intervals, each of which is between when the bus signal varies from the low level to the high level (e.g., the time (4) in FIGS. 7A-7H) and when the bus signal varies from the high level to the low level (e.g., the time (5) in FIGS. 7A-7H). Each of the eight intervals measured by the timer-B 14 corresponds to one-bit length of the bus signal. Thus, when the timer-B 14 is stopped, a value of the timer-B 14 represents the length of successive eight bits of the bus signal.

After the timer-B 14 is stopped at T4, the temporary synchronization signal detection interrupt routine proceeds to T5, where the comparator-B 16 determines whether the data stored in the memory-B 12 is equal to or greater than a product of 11/8 and the value of the timer-B 14. It is noted that the data stored in the memory-B 12 represents the length of the detected temporary synchronization signal. If the data stored in the memory-B 12 is equal to greater than the product of 11/8 and the value of the timer-B 14 corresponding to YES at T5, the temporary synchronization signal detection interrupt routine proceeds to T6, where it is determined that the detected temporary synchronization signal is the header of the synchronization signal. That is, at T6, it is determined that the Synch Break Field is detected. It is noted that an average duration of one-bit of the bus signal is calculated by dividing the value of the timer-B 14 by 8. Therefore, the product of 11/8 and the value of the timer-B 14 represents the length of 11 bits each of which has the average duration.

Thus, at T5, the average duration of each bit of the bus signal of 8 bits measured between the time (3) and the time (6) in FIG. 3 is calculated, and then it is determined whether the quotient of the interval (i.e., data stored in the memory-B 12) between the time (1) and the time (2) in FIG. 3 divided by the calculated average duration is 11 or more.

Figure 7H:
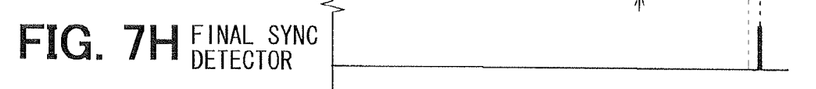

If the quotient is 11 or more corresponding to YES at T5, the temporary synchronization signal detection interrupt routine proceeds to T6. At T6, the final, synchronization signal detector 8 determines that a synchronization signal is detected and outputs a trigger signal as shown in FIG. 7H. Then, the temporary synchronization signal detection interrupt routine proceeds to T7, where the baud rate calculator 15 sets the reciprocal of the value of the timer-B 14 divided by 8 as a baud rate. In short, the baud rate calculator 15 sets the reciprocal of the average one-bit length as the baud rate.

FIG. 2 is an example of a hardware configuration of the slave node 3. In the example shown in FIG. 2, a divider 17 is placed between the timer-A 10 and the comparator-A 13. The divider 17 divides the value of the timer-A 10 by 8 and outputs the divided value to the comparator-A 13. Since 8 is the third power of 2, dividing the value of the timer-A 10 by 8 can be achieved by a binary shift operation. Therefore, for example, the divider 17 can be constructed with a shift register. As mentioned previously, when the slave node 3 receives the Synch Field, the timer-B 14 measures the duration of 8 (i.e. the third power of 2) bits of the bus signal.

A divider/adder 18 is placed between the timer-B 14 and the comparator-B 16. The divider/adder 18 calculates the sum of the value of the timer-B 14 (i.e., the duration of the third power of 2 bits), one-eighth of the value of the timer-B 14 (i.e., the duration of the zero power of 2 bits), and one-fourth of the value of the timer-B 14 (i.e. the duration of the first power of 2 bits). That is, the divider/adder 18 serves as an average duration calculator for calculating the average duration of the eight edge detection time intervals. Further, the divider/adder 18 multiplies the calculated average duration by 11. As a result, the divider/adder 18 multiplies the value of the timer-B 14 by 11/8. The calculation performed by the divider/adder 18 can be achieved by a binary shift operation. Therefore, for example the divider/adder 18 can be constructed with a shift register.

The comparator-B 16 compares the value calculated by the divider/adder 18 with the value stored in the memory-B 12. The value calculated by the divider/adder 18 represents the length of the bus signal of 11 bits. The value stored in the memory-B 12 represents the length of the detected temporary synchronization signal corresponding to the Synch Break Field.

When the value stored in the memory-B 12 is equal to or greater than the value calculated by the divider/adder 18, the temporary synchronization signal is determined as the synchronization signal, and the comparator-B 16 outputs the trigger signal SYNC as shown in FIG. 2.

Figures 8A, 8B:
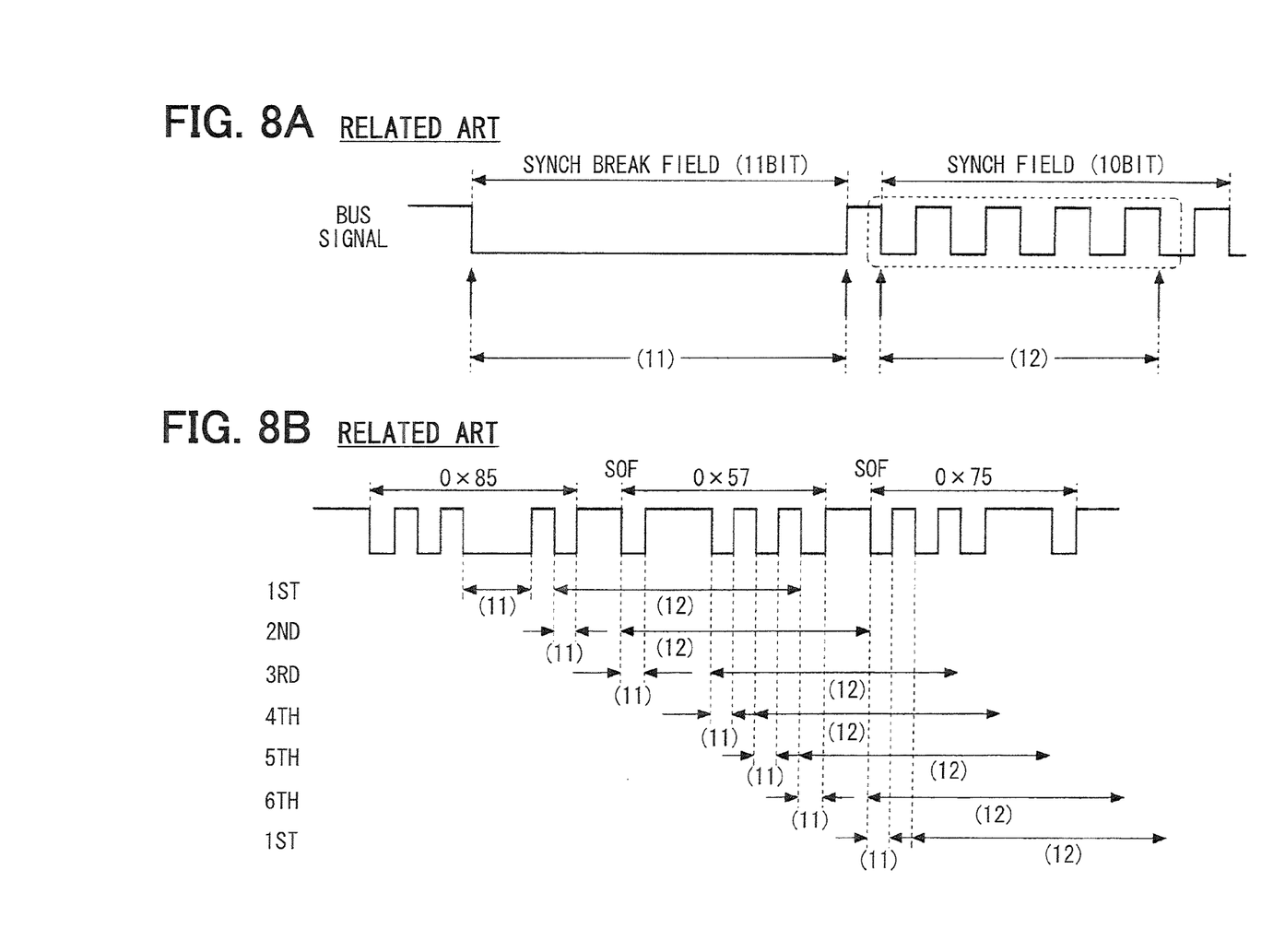
FIGS. 8A and 8B are diagrams for explaining a related art.

FIG. 8A is a synchronization signal according to LIN Specification, and FIG. 8B is a timing diagram according to a related art method for detecting the synchronization signal. In the related art method, a low level interval (11) from a falling edge as a start of field (SOF) to a next rising edge is measured, and then successive eight intervals (12) starting from a next falling edge are measured. Then, the total length of the successive eight intervals (12) is divided by 8 to calculate an average one-bit length. Then, when the low level interval (11) divided by the average one-bit length is 11 or more the low level interval (11) is determined as a Synch Break Field.

However, as shown in FIG. 8B, the related art method requires at least six memories. Therefore, to implement the related art method by hardware, a circuit size is increased.

The advantages of the embodiment over the related art method are summarized below. According to the embodiment, storage for the data of the bus signal is constructed with two memories, i.e., the memory-A 11 and the memory-B 12. Thus, a circuit size can be reduced.

According to the embodiment, when receiving the Nth power of 2 successive bits of the low level before receiving alternating bits starting with the high level, the temporary synchronization signal detector 7 determines that the temporary synchronization signal is detected. Therefore, if the number of the successive bits of the low level is less than the Nth power of 2, there is no need to perform complex calculations for detecting the synchronization signal. Thus, the frequency with which the complex calculations are performed can be reduced.

The final synchronization signal detector 8 determines that the temporary synchronization signal detected by the temporary synchronization signal detector 7 is the header of the synchronization signal, when the number of the successive bits of the temporary synchronization signal is equal to or greater than a predetermined value (i.e., integer M) that depends on a communication protocol For example, in the case of the LIN, the predetermined value can be 11.

The timer-A 10 measures the edge detection time interval between the falling edge (i.e., when the bus signal varies from the high level to the low level) and the rising edge (i.e., when the bus signal varies from the low level to the high level). The measured edge detection time interval is stored in the memory-A 11.

The comparator-A 13 compares the previously measured interval stored in the memory-A 11 with the presently measured interval that is presently measured by the timer-A 10. When the previous measured interval is 8 (i.e., Nth power of 2) or more times greater than the presently measured interval, the temporary synchronization signal detector 7 detects the temporary synchronization signal. The temporary synchronization signal detector 7 for detecting the temporary synchronization signal is constructed with the divider 17, the timer-A 10, the memory-A 11, and the comparator-A 13. Thus, a hardware configuration of the temporary synchronization signal detector 7 can be simplified so that the circuit size can be reduced.

In the case of detecting the Synch Break Field of 11 (i.e., the integer M) bits, the temporary synchronization signal detector 7 detects the temporary synchronization signal when the previous measured interval is 8 (i.e., the Nth power of 2) or more times greater than the presently measured interval. That is, the Nth power of 2 is equal to or less than the integer M, and the (N+1) power of 2 is greater than the integer M. It such an approach, the frequency with which the temporary synchronization signal detector 7 detects unnecessary temporary synchronization signals can be reduced as much as possible. Accordingly, the frequency with which the final synchronization signal detector 8 performs unnecessary complex calculations can be reduced as much as possible.

The divider/adder 18 calculates the product of 11/8 and the value of the timer-B 14 so that the average duration of eight bits (i.e., eight intervals) of the Synch Field can be multiplied by 11. In such an approach, even when the length of one bit of the bus signal changes due to noise or the like, the average duration of the eight bits can be accurately measured.

In the final synchronization signal detector 8, the comparator-B 16 compares the previously measured value stored in the memory-B 12 with the presently measured value of the timer-B 14 multiplied by 11/8. Then, when the previously measured value is greater than the presently measured value multiplied by 11/8, the final synchronization signal detector 8 determines that the temporary synchronization signal is the header of the synchronization signal. In such an approach, even when the length of one bit of the bus signal changes due to noise or the like, the synchronization signal can be accurately detected. Likewise, since the baud rate calculator 15 sets the reciprocal of the value of the timer-B 14 divided by 8 as a baud rate, the accuracy in calculating the baud rate can be improved.

For example, the timer-A 10 and the timer-B 14 can be constructed with a crystal oscillator or a CR oscillator. Generally, the CR oscillator is generally inexpensive than the crystal oscillator, but less accurate than the crystal oscillator. Therefore, if the timer-A 10 and the timer-B 14 are constructed with the CR oscillator, one-bit length of the bus signal may not be detected accurately due to jitter or the like. In particular, margin of error of oscillation frequency in the master node 2 and the slave node 3 according to the LIN specification 2.0 is less than that according to the LIN specification 1.3. Therefore, it is important to accurately detect the one-bit length in order to meet the LIN specification 2.0.

According to the embodiment, one-bit length of the bus signal is calculated by taking an average of the measured values of the intervals, each of which corresponds to one bit. In such an approach, even when one measured value is not accurate due to accuracy of the oscillator, the one-bit length can be detected accurately as much as possible. Further, even when accuracy of the timer-A 10 and the timer-B 14 varies from one product to another product, the one-bit length can be detected accurately as much as possible. Thus, the accuracy in detecting the synchronization signal and the accuracy in calculating the baud rate can be improved.

According to the embodiment, the baud rate (i.e., bit rate) is automatically detected. Therefore, the baud rate can be easily detected over a wide range of baud rate.

The timer-B 14 works in conjunction with the timer-A 10 to measure the successive eight intervals, each of which corresponds to one bit. The divider/adder 18 divides the value of the timer-B 14 independently by the duration of the third power of 2 bits, the duration of the second power of 2 bits, and the duration of the zero power of 2 bits. Then, the quotient of the value divided by the duration of the third power of 2 bits, the quotient of the value divided by the duration of the second power of 2 bits, and the quotient of the value divided by the zero of the third power of 2 bits are added together to calculate the duration of 11 bits of the bus signal. The calculated duration of 11 bits is compared with the value stored in the memory-B 12. That is, the calculations performed by the divider/adder 18 can be achieved by a binary shift operation. Therefore, the divider/adder 18 can be simplified in configuration and constructed with a shift resistor, for example.

According to the embodiment, the Synch Break Field is transmitted from the master node 2 to the slave node 3 through the bus 1 at any time, the slave node 3 can detect the Synch Break Field as the header of the Synch Field (i.e., synchronization signal).

(Modifications)

The embodiment described above can be modified in various ways, for example, as follows. At S5 of the flow chart shown in FIG. 4B, the interval from the falling edge to the rising edge is stored in the memory-A 11. Alternatively, the interval from the rising edge to the falling edge can be stored in the memory-A 11.

The timer-B 14 measures both the intervals from the falling edge to the rising edge and the intervals from the rising edge to the falling edge to calculate the average one-bit length of the bus signal. Alternatively, the timer-B 14 can measure only the intervals from the falling edge to the rising edge to calculate the average one-bit length of the bus signal. Alternatively, the timer-B 14 can measure only the intervals from the rising edge to the falling edge to calculate the average one-bit length of the bus signal.

At T3 of the flow chart shown in FIG. 5, the number of the measured intervals (i.e. bits) is counted by detecting the falling edge. Alternatively, the number of the measured intervals can be counted by detecting the rising edge.

In the embodiment, the temporary synchronization signal detector 7 detects the temporary synchronization signal when the previous measured interval is 8, which is the third (i.e., Nth) power of 2, or more times greater than the presently measured interval, because the number 8 is the maximum number that is a power of 2 and less than the minimum number 11 of successive low bits of the Synch Break Field according to the LIN specification. The integer N can be changed depending on a communication protocol specification. Since the integer N can be changed by a binary shift operation, the temporary synchronization signal detector 7 can be simplified in configuration and reduced in size.

Such changes and modifications are to be understood as being within the scope of the present invention as defined by the appended claims.

What is claimed is:

1. A synchronization signal detection apparatus for a bus signal varying between a first level and a second level, the bus signal including a header field and a synchronization signal field following the header field, the header field having at least M successive bits of the first level, where M is an integer more than the Nth power of 2, where N is a positive integer, the synchronization signal field having alternating bits starting with the second level, the synchronization signal detector comprising:

a temporary synchronization signal detector configured to detect the Nth power of 2 successive bits of the first level as a temporary synchronization signal when receiving the Nth power of 2 successive bits of the first level before receiving the alternating bits; and a final synchronization signal detector configured to determine that the detected temporary synchronization signal is the header field when receiving the at least M successive bits of the first level and when detecting that the integer M exceeds the Nth power of 2.

2. The synchronization signal detection apparatus according to claim 1, wherein the temporary synchronization signal detector includes a timer, a memory, and a comparator, the timer measures an interval from when the bus signal varies from the second level to the first level to when the bus signal varies from the first level to the second level and/or an interval from when the bus signal varies from the first level to the second level to when the bus signal varies from the second level to the first level, the memory stores the measured interval, the comparator compares the previously measured interval stored in the memory with a presently measured interval that is presently measured by the timer, and the temporary synchronization signal detector detects the temporary synchronization signal when the previous measured interval is the Nth power of 2 or more times greater than the presently measured interval.

3. The synchronization signal detection apparatus according to claim 1, wherein
the Nth power of 2 is equal to or less than the integer M, and the (N+1) power of 2 is greater than the integer M.

4. The synchronization signal detector according to claim 1, further comprising:
a timer configured to measure an interval from when the bus signal varies from the second level to the first level to when the bus signal varies from the first level to the second level and/or an interval from when the bus signal varies from the first level to the second level to when the bus signal varies from the second level to the first level, each interval corresponding to the bit length, and
an average duration calculator configured to calculate an average duration corresponding to the bit length by taking an average of a plurality of intervals, each of which is measured by the timer, wherein
the final synchronization signal detector determines that the detected temporary synchronization signal is the header field when a length of the detected temporary synchronization signal divided by the calculated average duration is the integer M or more.

5. The synchronization signal detection apparatus according to claim 1, further comprising:
a timer configured to measure an interval from when the bus signal varies from the second level to the first level to when the bus signal varies from the first level to the second level and/or an interval from when the bus signal varies from the first level to the second level to when the bus signal varies from the second level to the first level, each interval corresponding to the bit length;
an average duration calculator configured to calculate an average duration corresponding to the bit length by taking an average of a plurality of intervals, each of which is measured by the timer; and
a baud rate calculator configured to calculate a baud rate by calculating the reciprocal of the calculated average duration.

6. The synchronization signal detection apparatus according to claim 2, wherein the timer has a CR oscillator.

7. The synchronization signal detection apparatus according to claim 2, wherein
the integer M is 11,
the timer measures a duration of successive eight intervals of the bus signal,
the temporary synchronization signal detector divides the measured duration by the third power of 2 bits to obtain a first duration of 1 bit, divides the measured duration by the second power of 2 bits to obtain a second duration of 2 bits, and divides the measured duration by the zero power of 2 bits to obtain a third duration of 8 bits,
the temporary synchronization signal detector calculates the sum of the first duration, the second duration, and the third duration to obtain a fourth duration of 11 bits, and
the temporary synchronization signal detector compares the fourth duration of 11 bits with the previously measured interval stored in the memory to determine whether the detected temporary synchronization signal is the header field.

8. The synchronization signal detection apparatus according to claim 7, wherein
the temporary synchronization signal detector includes a shift register, and
the first duration, the second duration, and the third duration are obtained by using the shift register.

* * * * *